US010924993B2

(12) United States Patent
Kneckt et al.

(10) Patent No.: US 10,924,993 B2
(45) Date of Patent: Feb. 16, 2021

(54) WAKE-UP FRAME WITH CONFIGURABLE PAYLOAD

(71) Applicant: Apple Inc., Cupertino, CA (US)

(72) Inventors: Jarkko L. Kneckt, Los Gatos, CA (US); Matthew L. Semersky, San Jose, CA (US); Christiaan A. Hartman, San Jose, CA (US); Oren Shani, Saratoga, CA (US); Yong Liu, Campbell, CA (US); Xiaowen Wang, Cupertino, CA (US); Tushar R. Shah, Cupertino, CA (US); Yoel Boger, Shoham (IL); Rajneesh Kumar, Los Gatos, CA (US); Josef Peery, Kadima (IL); Christian W. Mucke, Cupertino, CA (US); Guoqing Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/109,985

(22) Filed: Aug. 23, 2018

(65) Prior Publication Data
US 2019/0069231 A1 Feb. 28, 2019

Related U.S. Application Data

(60) Provisional application No. 62/549,572, filed on Aug. 24, 2017.

(51) Int. Cl.
H04W 52/02 (2009.01)
H04W 28/06 (2009.01)
(Continued)

(52) U.S. Cl.
CPC ..... *H04W 52/0206* (2013.01); *H04W 28/065* (2013.01); *H04W 52/0235* (2013.01); *H04W 84/12* (2013.01); *H04W 88/08* (2013.01)

(58) Field of Classification Search
None
See application file for complete search history.

(56) References Cited

U.S. PATENT DOCUMENTS

| 2014/0223164 A1* | 8/2014 | Jiang | G06F 9/4418 713/100 |
| 2017/0094600 A1* | 3/2017 | Min | H04L 5/0007 |

(Continued)

FOREIGN PATENT DOCUMENTS

WO WO2018085571 A1 5/2018

OTHER PUBLICATIONS

Extended European Search Report, European Patent Application No. 18190628.0, dated Nov. 30, 2018, five pages.

*Primary Examiner* — Jenkey Van
(74) *Attorney, Agent, or Firm* — Kowert, Hood, Munyon, Rankin & Goetzel, P.C.

(57) ABSTRACT

An interface circuit in an electronic device (such as an access point) may utilize a configurable wake-up-frame format. During operation, the interface circuit may receive a wake-up-radio (WUR)-setup request associated with a recipient electronic device, where the WUR-setup request specifies a proposed configurable wake-up-frame format. In response, the electronic device may determine the configurable wake-up-frame format to be used based at least in part on the proposed configurable wake-up-frame format. Then, the interface circuit may provide a WUR-setup response intended for the recipient electronic device, where the WUR-setup response specifies the configurable wake-up-frame format selected for use. Note that the configurable wake-up-frame format may specify a payload length in a wake-up frame and/or one or more operations of at least one of the recipient electronic device or the electronic device after the wake-up frame is transmitted by the electronic device.

20 Claims, 15 Drawing Sheets

(51) Int. Cl.
*H04W 88/08* (2009.01)
*H04W 84/12* (2009.01)

(56) References Cited

U.S. PATENT DOCUMENTS

| | | |
|---|---|---|
| 2017/0202011 A1 | 7/2017 | Trainin |
| 2017/0332327 A1 | 11/2017 | Fang |
| 2018/0132176 A1 | 5/2018 | Abraham |
| 2019/0007904 A1* | 1/2019 | Asterjadhi ........ H04W 52/0274 |
| 2019/0159127 A1* | 5/2019 | Son .................. H04W 52/0222 |
| 2019/0281551 A1* | 9/2019 | Kim .................. H04W 52/0229 |
| 2020/0053649 A1* | 2/2020 | Yao ....................... H04W 76/28 |

* cited by examiner

| BIT 0 | BIT 1 | BIT 2 | BIT 3 | BIT 4 | BIT 5 | BIT 6 | BIT 7 |
|---|---|---|---|---|---|---|---|
| 1 | 0 | 0 | 1 | 0 | 0 | 1 | 0 |

WAKE-UP FRAME WITH CONFIGURABLE PAYLOAD

CROSS-REFERENCE TO RELATED APPLICATION

This application claims the benefit of U.S. Provisional Application No. 62/549,572, entitled "Wake-Up Frame with Configurable Payload, by Jarkko L. Knecht, et al., filed Aug. 24, 2017, the contents of which are hereby incorporated by reference.

FIELD

The described embodiments relate, generally, to wireless communications among electronic devices, and techniques for setting up a configurable payload in a wake-up frame.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device that communicates using wireless communication in a WLAN may consume a significant amount of power.

In order to address this challenge, a new radio technology called Low Power Wake Up Radio or Wake-Up Radio (WUR) is being considered. The WUR may be a companion to the main Wi-Fi radio in the electronic device. Notably, by using the WUR, the electronic device may turn off its main radio and may wake up the main radio in response to the WUR receiving a wake-up frame or packet from an access point. For example, the access point may send the wake-up frame when there is a down-link packet for the electronic device and, based on the information included in the wake-up frame, the WUR may selectively transition the main radio from a lower-power mode to a higher-power mode.

The WUR typically communicates using a low data rate, such as using on-off keying at 250 kb/s. Therefore, a length of the wake-up frame can, at least in part, determine a latency or delay before the main radio transitions to the normal operating mode. If the wake-up frame length is too large, this may needlessly increase the latency or delay, which may adversely impact the communication performance of the electronic device.

SUMMARY

A first group of embodiments relate to an electronic device that utilizes a selected configurable wake-up-frame format. This electronic device may include a node that can be communicatively coupled to an antenna, and an interface circuit communicatively coupled to the node and that communicates with a recipient electronic device. During operation, the interface circuit receives a wake-up-radio (WUR)-setup request associated with the recipient electronic device, where the WUR-setup request specifies a proposed configurable wake-up-frame format. Then, the interface circuit provides a WUR-setup response intended for the recipient electronic device, where the WUR-setup response specifies the selected configurable wake-up-frame format.

Moreover, the electronic device may determine the selected configurable wake-up-frame format based at least in part on the proposed configurable wake-up-frame format.

Furthermore, the interface circuit may provide a wake-up frame for the recipient electronic device that includes the selected configurable wake-up-frame format. The wake-up frame may signal that a main radio (or another radio) in the recipient electronic device is to transition from a lower-power mode to a higher-power mode.

Additionally, the selected configurable wake-up-frame format may specify a payload length in a wake-up frame.

In some embodiments, the selected configurable wake-up-frame format may specify one or more operations of at least one of the recipient electronic device and/or the electronic device after a wake-up frame is transmitted by the electronic device.

Note that the electronic device may include an access point.

Moreover, the WUR-setup request and the WUR-setup response may be compatible with an IEEE 802.11 communication protocol.

Other embodiments provide an interface circuit in the electronic device.

Still other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Still other embodiments provide a method for providing a selected configurable wake-up-frame format. The method includes at least some of the aforementioned operations performed by the interface circuit in the electronic device.

A second group of embodiments relate to the recipient electronic device that receives the selected configurable wake-up-frame format from the first group of embodiments. This recipient electronic device may include a node that can be communicatively coupled to an antenna, and an interface circuit communicatively coupled to the node and that communicates with the electronic device. The interface circuit may include the WUR and the main radio. During operation, the main radio provides a WUR-setup request intended for the electronic device, where the WUR-setup request specifies the proposed configurable wake-up-frame format. Then, the main radio receives a WUR-setup response associated with the electronic device, where the WUR-setup response specifies the selected configurable wake-up-frame format.

Other embodiments provide an interface circuit in the recipient electronic device.

Still other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Still other embodiments provide a method for receiving a selected configurable wake-up-frame format. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
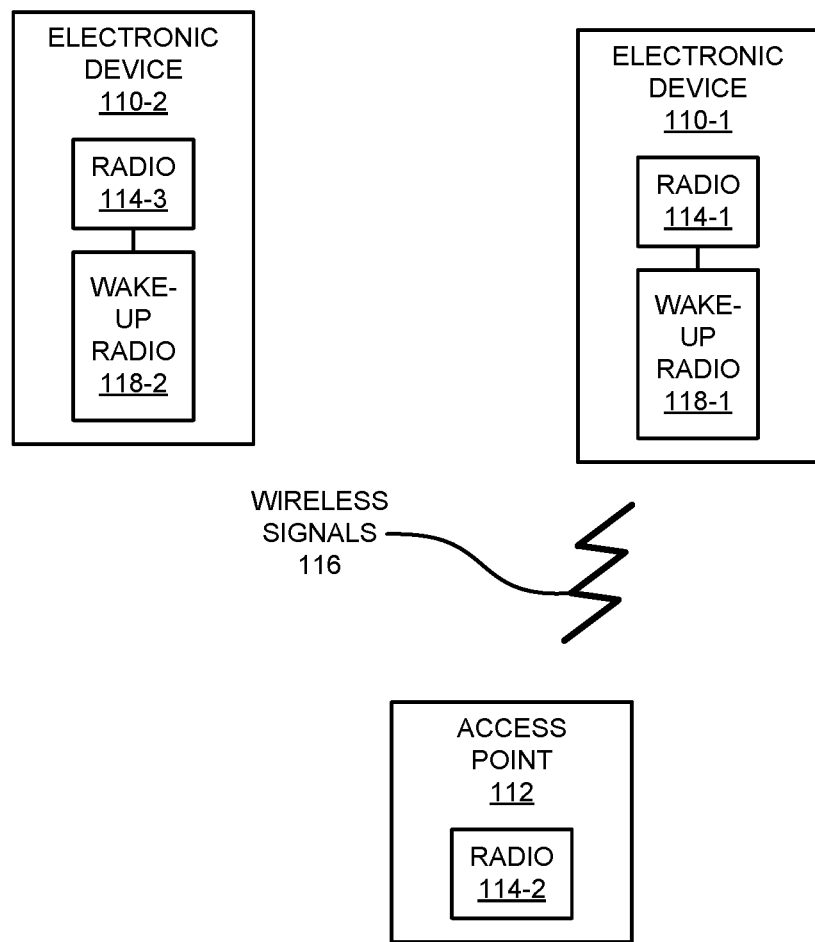
FIG. 1 is a block diagram illustrating an example of electronic devices communicating wirelessly.

An interface circuit in an electronic device (such as an access point) may utilize a configurable wake-up-frame format. During operation, the interface circuit may receive a WUR-setup request associated with a recipient electronic device, where the WUR-setup request specifies a proposed configurable wake-up-frame format. In response, the interface circuit may determine the configurable wake-up-frame format to be used based at least in part on the proposed configurable wake-up-frame format. Then, the interface circuit may provide a WUR-setup response intended for the recipient electronic device, where the WUR-setup response specifies the configurable wake-up-frame format selected for use. Note that the configurable wake-up-frame format may specify a payload length in a wake-up frame and/or one or more operations of at least one of the recipient electronic device or the electronic device after the wake-up frame is transmitted by the electronic device.

Furthermore, the recipient electronic device may include an interface circuit (or circuits) that includes a WUR and a main radio. During operation, the WUR may provide a WUR-setup request for the electronic device, where the WUR-setup request specifies a proposed configurable wake-up-frame format. Then, the WUR may receive a WUR-setup response associated with the recipient electronic device, where the WUR-setup response specifies a configurable wake-up-frame format.

By providing the configurable wake-up-frame format, this communication technique may reduce the latency or delay when selectively transitioning the main radio to or from the lower-power mode. This capability may facilitate more efficient operation of the main radio. Consequently, the communication technique may reduce power consumption and delays, and may improve the communication performance of the electronic device and/or the recipient electronic device. Thus, the communication technique may improve the user experience when using the electronic device or the recipient electronic device, and therefore may increase customer satisfaction and retention.

Note that the communication technique may be used during wireless communication between electronic devices in accordance with a communication protocol, such as a communication protocol that is compatible with an IEEE 802.11 standard (which is sometimes referred to as Wi-Fi). In some embodiments, the communication technique is used with IEEE 802.11BA and/or IEEE 802.11ax, which are used as illustrative examples in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.), e.g., that are referred to as Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, a wearable or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 15, electronic devices 110 and access point 112 may include subsystems, such as any/all of a networking subsystem, a memory subsystem, and/or a processor subsystem. In addition, electronic devices 110 and access point 112 may include radios 114, e.g., in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include WURs 118 that listen for and/or receive wake-up frames or packets (and/or other wake-up communications, such as a wake-up beacon) from access point 112. When a particular electronic device (such as electronic device 110-1) receives a wake-up frame, WUR 118-1 may selectively wake up radio 114-1, e.g., provide a wake-up signal that selectively transitions radio 114-1 from a lower-power mode to the higher-power mode.

As described previously, if a wake-up frame has a fixed length, this may needlessly increase the latency or delay, which may adversely impact the communication performance of electronic device 110-1. In order to address this problem, during operation electronic device 110-1 (such as radio 114-1) may provide a wake-up-radio (WUR)-setup request to access point 112. This WUR-setup request may specify a proposed configurable wake-up-frame format. After radio 114-2 receives the WUR-setup request, access point 112 may determine a configurable wake-up-frame format based at least in part on the proposed configurable wake-up-frame format. Then, radio 114-2 may provide a WUR-setup response to electronic device 110-1, where the WUR-setup response specifies the configurable wake-up-frame format. Embodiments of payload-configuration elements in the WUR-setup request or the WUR-setup response are described further below with reference to FIG. 9.

During subsequent operation, access point 112 (such as radio 114-2) may determine whether to send a wake-up frame to one or more recipient electronic devices (such as electronic device 110-1) with information that specifies that one or more recipient electronic devices are to transition from the lower-power mode. For example, access point 112 may determine whether to send a wake-up frame to electronic device 110-1 based at least in part on pending traffic intended for or addressed to electronic device 110-1. Then, radio 114-2 may provide a wake-up frame for the one or more recipient electronic devices (and, notably, for one or more WURs 118). This wake-up frame may be associated with at least one or more channels in a band of frequencies (e.g., radio 114-2 may transmit the wake-up frame in the sub-channel), and/or the wake-up frame may be provided within an associated time interval, such as a keep-alive interval of access point 112 (such as a keep-alive interval between, e.g., 1 and 10 s). Moreover, the wake-up frame may include or may have the configurable wake-up-frame format. Embodiments of the configurable wake-up-frame format are described further below with reference to FIGS. 6-8, and an embodiment of a bitmap of available configurations in a configurable payload for a wake-up frame is described further below with reference to FIG. 10.

After receiving the wake-up frame, WUR 118-1 may provide, to radio 114-1, a wake-up signal that transitions radio 114-1 from the lower-power mode to the higher-power mode. Alternatively, when the information does not specify electronic device 110-1, WUR 118-1 may take no further action, e.g., radio 114-1 may remaining in the lower-power mode. More generally, in some embodiments after WUR 118-1 receives the wake-up frame, the WUR 118-1 may analyze the information in the wake-up frame to determine if radio 114-1 should transition from the lower-power mode. Thus, in the embodiments, the 'intelligence' as to whether to transition from the lower-power mode in the communication technique may be implemented by access point 112 (such as when access point 112 determines whether it will send the wake-up frame to electronic device 110-1) and/or in electronic device 110-1 (which may analyze the information included in the wake-up frame).

Moreover, the configurable wake-up-frame format may specify a payload length in a wake-up frame. Consequently, the wake-up frame may specify how long radio 114-1 remains in the higher-power mode. As described further below with reference to FIGS. 9 and 11-14, in some embodiments, the configurable wake-up-frame format may specify operations of at least one of electronic device 110-1 and/or access point 112 after the wake-up frame is transmitted by access point 112.

Note that WUR 118-1 may operate continuously or in a duty-cycle mode. For example, WUR 118-1 may wake up to or transition to the higher-power mode from the lower-power mode to receive the wake-up frame. In some embodiments, radio 114-2 may provide wake-up frames once, as needed (such as when there is downlink traffic) or periodically (such as within the associated time interval).

In these ways, the communication technique may allow electronic devices 110 and access point 112 to communicate efficiently (such as with low latency and high throughput) while significantly reducing the power consumption associated with radios 114 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. This trigger frame may be provided after a time delay (such as a time delay between, e.g., 10 and 300 ms), so that radio 114-1 has sufficient time to transition to the higher-power mode. Moreover, after radio 118-1 receives the wake-up frame and radio 114-1 transitions to the higher-power mode, radio 114-1 may provide a group acknowledgment to radio 114-2. Notably, radio 114-1 may provide the acknowledgment during an assigned time slot and/or in an assigned channel in the group acknowledgment. However, in some embodiments the one or more recipient electronic devices may individually provide acknowledgments to radio 114-2. Thus, after radio 118-1 receives the wake-up frame and radio 114-1 transitions to the higher-power mode, radio 114-1 (and, more generally, the main radios in the one or more recipient electronic devices) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include any/all of: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
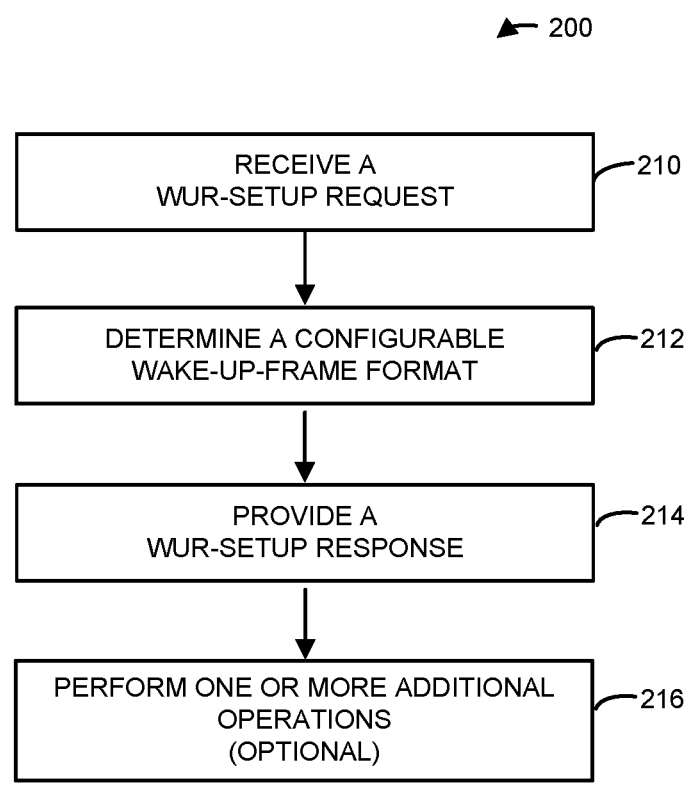
FIG. 2 is a flow diagram illustrating an example method for providing a configurable wake-up-frame format using one of the electronic devices in FIG. 1.

FIG. 2 presents a flow diagram illustrating an example method 200 for providing a configurable wake-up-frame format. This method may be performed by an electronic device, such as an interface circuit in access point 112 in FIG. 1. During operation, the interface circuit may receive a WUR-setup request (operation 210) associated with the recipient electronic device, where the WUR-setup request specifies a proposed configurable wake-up-frame format. Then, the electronic device may optionally determine the configurable wake-up-frame format (operation 212) based at least in part on the proposed configurable wake-up-frame format. Moreover, the interface circuit may provide a WUR-setup response (operation 214) intended for the recipient electronic device, where the WUR-setup response specifies the configurable wake-up-frame format.

Note that the configurable wake-up-frame format may specify a payload length in a wake-up frame. Furthermore, note that the WUR-setup request and the WUR-setup response may be compatible with an IEEE 802.11 communication protocol.

In some embodiments, the interface circuit optionally performs one or more additional operations (operation 216). For example, the interface circuit may provide a wake-up frame for the recipient electronic device that includes the configurable wake-up-frame format. The wake-up frame may signal that a main radio (or another radio) in the recipient electronic device is to transition from a lower-power mode to a higher-power mode. Additionally, in some embodiments, the configurable wake-up-frame format may specify operations of at least one of the recipient electronic device and/or the electronic device after a wake-up frame is transmitted by the electronic device.

Figure 3:
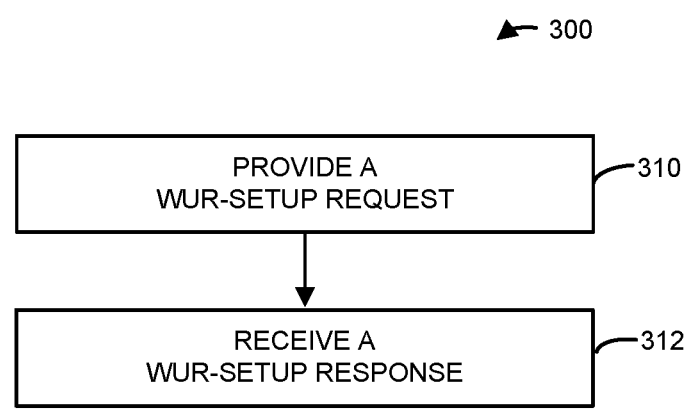
FIG. 3 is a flow diagram illustrating an example method for receiving a configurable wake-up-frame format using one of the electronic devices in FIG. 1.

FIG. 3 presents a flow diagram illustrating an example method 300 for receiving a configurable wake-up-frame format. This method may be performed by a recipient electronic device, such as an interface circuit in electronic device 110-1 in FIG. 1. This interface circuit may include a WUR and a main radio. During operation, the main radio may provide a WUR-setup request (operation 310) intended for the electronic device, where the WUR-setup request specifies the proposed configurable wake-up-frame format. Then, the main radio may receive a WUR-setup response (operation 312) associated with the electronic device, where the WUR-setup response specifies the configurable wake-up-frame format.

In some embodiments of methods 200 (FIG. 2) and/or 300, there may be additional or fewer operations. Moreover, the order of the operations may be changed, and/or two or more operations may be combined into a single operation or performed at least partially in parallel.

In some embodiments, at least some of the operations in methods 200 (FIG. 2) and/or 300 are performed by an interface circuit in the electronic device. For example, at least some of the operations may be performed by firmware executed by an interface circuit, such as firmware associated with a MAC layer, as well as one or more circuits in a physical layer in the interface circuit.

Figure 4:
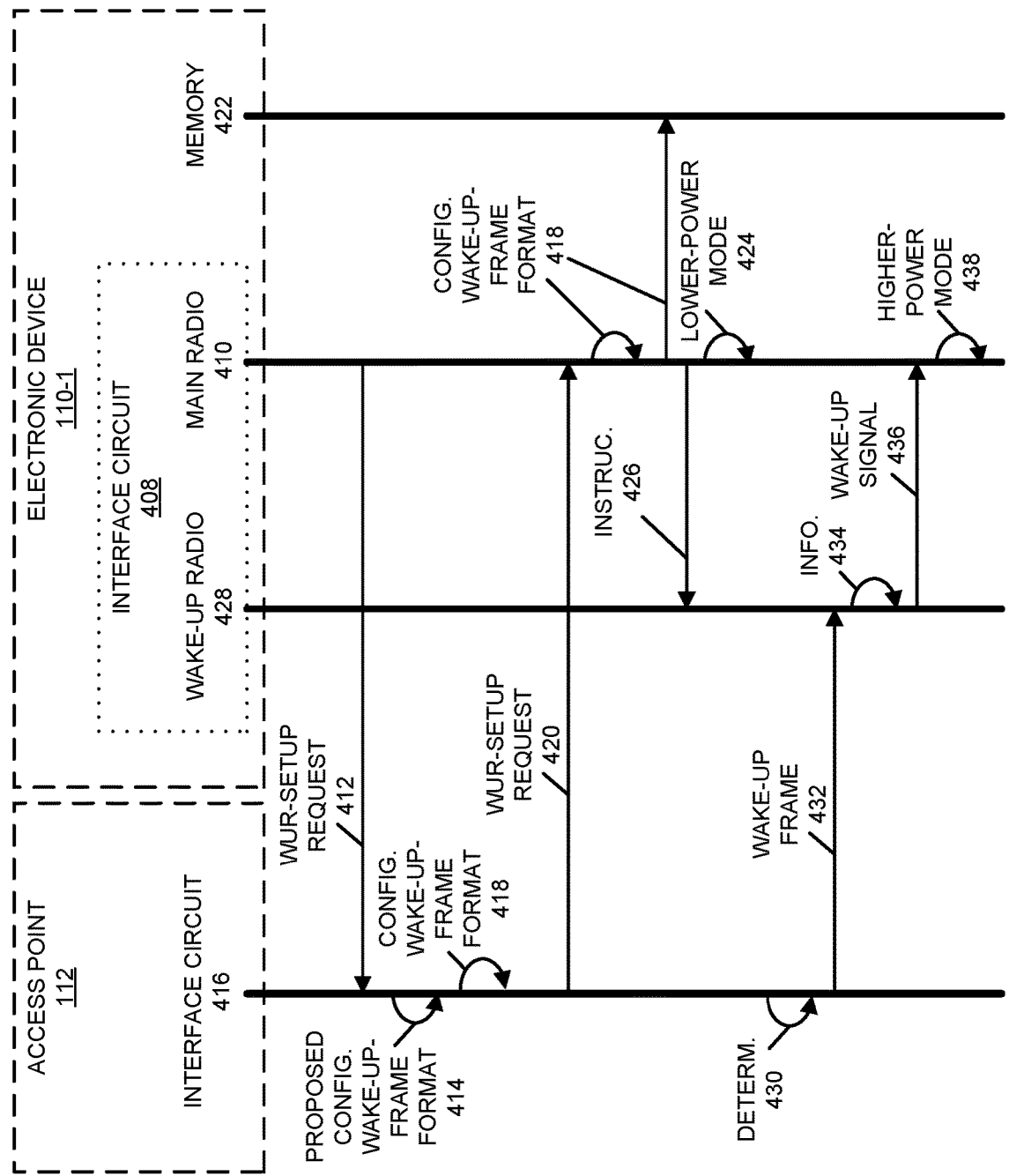
FIG. 4 is a flow diagram illustrating an example of communication between electronic devices, such as the electronic devices of FIG. 1.

The communication technique is further illustrated in FIG. 4, which presents a flow diagram illustrating an example of communication between electronic device 110-1 and access point 112. After associating with access point 112, main radio 410 (such as radio 114-1) in interface circuit 408 in electronic device 110-1 may provide a WUR-setup request 412 for access point 112, where the WUR-setup request 412 specifies the proposed configurable wake-up-frame format 414.

After receiving the WUR-setup request 412, interface circuit 416 (such as radio 114-2) may extract the proposed configurable wake-up-frame format 414. Then, based at least in part on the proposed configurable wake-up-frame format 414, interface circuit 416 may determine configurable wake-up-frame format 418. Next, interface circuit 416 may provide a WUR-setup response 420 for electronic device 110-1, where the WUR-setup response 420 specifies the configurable wake-up-frame format 418.

After receiving the WUR-setup response 420, main radio 410 may extract the configurable wake-up-frame format 418, and main radio 410 may use the configurable wake-up-frame format 418 when processing a subsequent wake-up frame. For example, main radio 410 may store the configurable wake-up-frame format 418 in memory 422. Next, main radio 410 may transition from the higher-power mode to the lower-power mode 424, and may instruct 426 WUR 428 that it is transitioning to the lower-power mode 424.

Subsequently, interface circuit 416 may determine 430 to provide wake-up frame 432 for WUR 428. For example, interface circuit 416 may determine 430 to provide wake-up frame 432 when there is downlink traffic for electronic device 110-1. Then, interface circuit 416 may provide wake-up frame 432 for electronic device 110-1, where wake-up frame 432 includes or has the configurable wake-up-frame format 418.

After receiving wake-up frame 432, WUR 428 in interface circuit 408 may extract information 434 from wake-up frame 432 based at least in part on the configurable wake-up-frame format 418. If the information 434 specifies electronic device 110-1, WUR 428 may provide a wake-up signal 436 to main radio 410. In response, main radio 410 may transition from the lower-power mode 424 to the higher-power mode 438.

Figure 5:
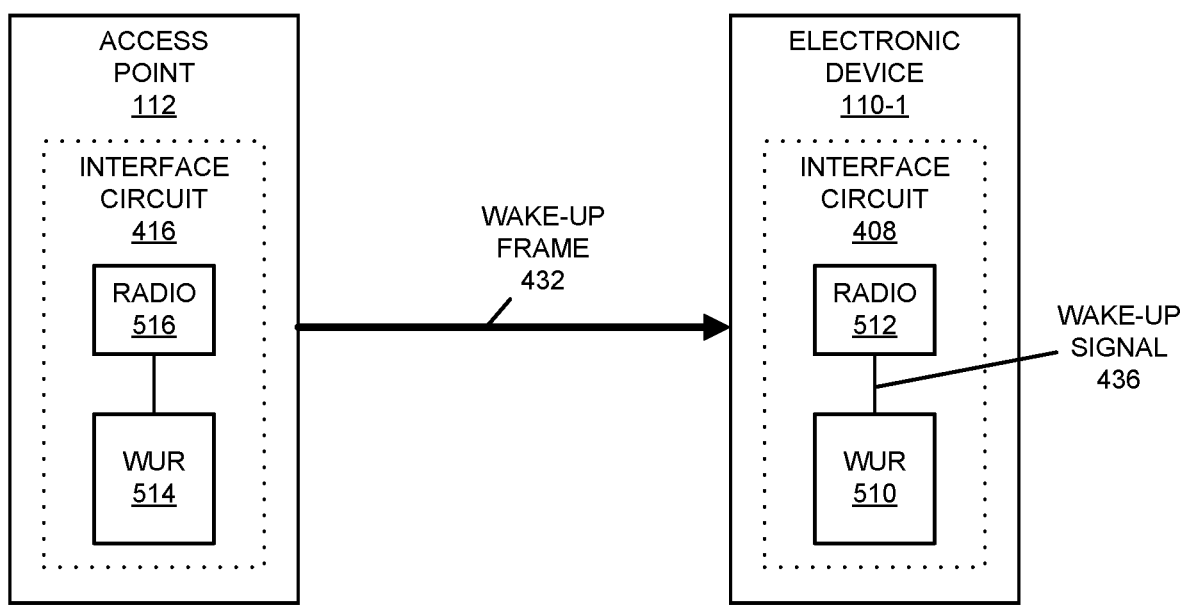
FIG. 5 is a drawing illustrating an example interface circuit in one of the electronic devices in FIG. 1.

FIG. 5 presents a drawing illustrating an example interface circuit 408 in electronic device 110-1, a WUR 510 (such as WUR 118-1 or 430) may be a companion radio to a main (Wi-Fi) radio 512 (such as radio 114-1 or 410) in interface circuit 408. WUR 510 may allow electronic device 110-1 to turn off (or put into a lower power state) main radio 512 (such as radio 144-1), e.g., whenever possible. Moreover, WUR 510 may wake up main radio 512 when wake-up frame 428 (such as a wake-up-radio packet), sent from optional WUR 514 or radio 516 (such as radio 114-2) in access point 112, specifies electronic device 110-1. Note that in some embodiments WUR 510 is configured to receive wireless signals, while main radio 512 is configured to transmit and to receive wireless signals. In these ways, the power consumption of WUR 510 may be very low, e.g., lower than Bluetooth Low Energy. In some other embodiments, WUR 510 may be configured to transmit and receive wireless signals, while still achieving a power savings. WUR 510 can operate in an always-on mode and/or in a duty-cycle mode.

As discussed previously, a fixed wake-up frame format may result in increased latency and power consumption of a recipient electronic device. These problems may be addressed by the disclosed embodiments of the communication technique. Notably, the communication technique may allow a recipient electronic device (which is sometimes referred to as a 'station' or STA, and which is other than or different from an access point) and/or an access point to dynamically or flexibly configure a wake-up frame payload, and thus, a wake-up-frame length. This capability may allow the recipient electronic device and/or the access point to reduce the wake-up frame length and may ensure that the WUR supports vendor-specific wake-up-frame setup signaling. Note that the communication technique may reduce transmission overhead, may reduce power consumption by the recipient electronic device, and/or may reduce latency.

Moreover, a wake-up frame may be short to increase or maximize the WUR capacity, and to allow the use of the main radio to be adjusted. In order to facilitate these capabilities, the recipient electronic device and/or the access point may configure the wake-up-frame payload, and thus the recipient electronic device and/or the access point operations after the wake-up frame is transmitted. Typically, a default operation is performed after the majority of wake-up frame transmissions. In these embodiments, the wake-up frame that signals or indicates the default operation has a short payload length (which may be a smaller or the minimum payload length). Moreover, operation of the WUR may be flexible, so that the WUR can be configured using vendor-specific parameters (without limitations), required measurement and/or operating-parameter information, so that a large number of WUR use cases can be supported.

Furthermore, a variety of operations may be performed when a wake-up frame is received. For example, in some embodiments, an access point or a recipient electronic device may specify multiple alternative operations after the wake-up frame is received, such as: the access point may have multiple main radios in different bands and the access point may use a wake-up frame to indicate the most suitable main radio and the band of frequencies for this main radio; the access point may use a wake-up frame to indicate that the main-radio operating bandwidth (such as that the recipient electronic device needs to be able to operate at, e.g., 20, 40, 80 or 160 MHz); the access point may use a wake-up frame to indicate if the recipient electronic device has urgent data (such as a specific condition with urgent data); the access point may use a wake-up frame to indicate a targeted-wake-up mode (such as announced/unannounced or triggered/non-triggered) of the main radio in the recipient electronic device after wake up; and/or the access point may use a wake-up frame to indicate that the start of the operation of the main radio in the recipient electronic device is immediate or delayed.

Additionally, a variety of different payload types may be used in a wake-up frame. Notably, an access point may use a wake-up frame to indicate measurement data for a recipient electronic device, such as: a basic-service-set (BSS) load, use of access-point resources and/or airtime. Alternatively or additionally, an access point may also use a wake-up frame to indicate if another BSS is using the same color value as a respective recipient electronic device. Note that some operations or signaling information may be vendor-specific or may be defined by one or more standardization bodies. Consequently, a wake-up frame may be flexible and may support a wide range of parameters that can be delivered from the access point to the recipient electronic device.

Figure 6:
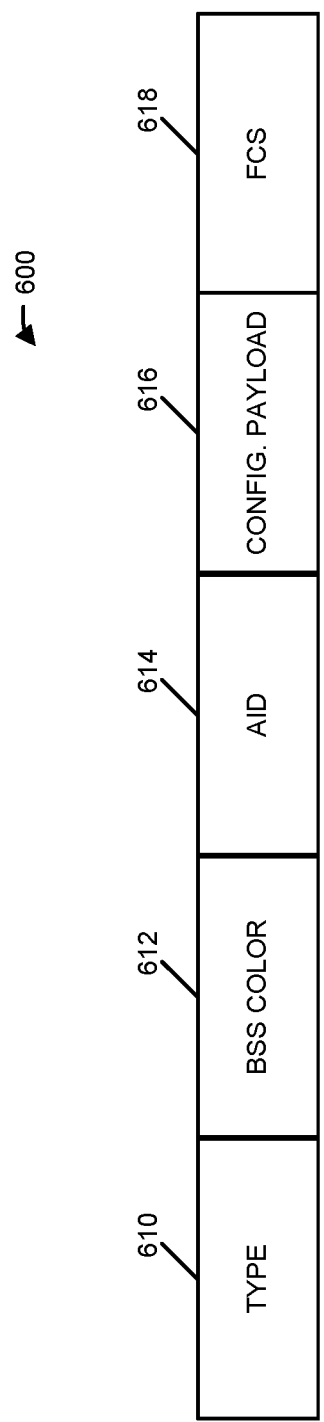
FIGS. 6-8 are drawings illustrating example wake-up frames.

In some embodiments, the wake-up-frame structure may be very short and may contain the information needed to detect the frame type, address information and/or a frame check sum (FCS). FIG. 6 presents a drawing illustrating an example wake-up frame 600. This wake-up frame may include: a type 610 (such as, e.g., bits that specify unicast, broadcast for data, broadcast for new management information, or multicast), a BSS color 612 or identifier (such as, e.g., one of 64 BSS colors), an optional association identifier (AID) 614, an optional configurable payload 616, and/or FCS 618 (such as, e.g., 4 bits).

Note that, e.g., a 12-bit BSS color 612 may be long enough to avoid color collisions. Moreover, the AID 614 can indicate broadcast/multicast/unicast receivers. However, the AID 614 may not be needed for broadcast announcement, e.g. if a multiple BSSID is not supported. In some embodiments, in order to decrease wake-up frame overhead, a payload 616 in the wake-up frame 600 may not be needed. Alternatively, in order to decrease wake-up frame overhead, the wake-up frame 600 may have a different or variable length. Furthermore, the type combined with the AID 614 may indicate different types of wake-up signals, such as: unicast data/management frame wake up, broadcast data frame wake up, broadcast management frame wake up, and/or management information announcement to announce new BSS operation parameters (such as a new BSS operation parameter announcement, a BSS operation channel, timing-synchronization-function time synchronization, a BSS recovery announcement, a beacon announcement, etc.). Details of the payload 616 in the wake-up frame 600 are provided below.

Additionally, note that a group of recipient electronic devices may wake up together to receive group frames or downlink a multi-user (MU) physical layer convergence procedure (PLCP) protocol data unit (MU PPDU). Note that static groups (including the group identifier and group members) may be maintained through an action frame. In some embodiments, an access point may allocate some AIDs, which are not used by associated recipient electronic devices, as one or more group identifiers. Moreover, a dynamic group (such as a multicast group without group announcement/negotiation) may be defined using different techniques, such as: part of a multicast media access control (MAC) address that may be included in the AID field of a wake-up frame; a hash result of a multicast MAC address that may be included in the AID field of a wake-up frame; an AID bitmap that may be included in a wake-up frame and/or sequential multiple wake-up frames with a short inter-frame space; and/or an AID set that includes multiple AIDs, which may be included in a wake-up frame and/or sequential multiple wake-up frames with a short inter-frame space. Note that it may be easier to receive a group of frames that include part of a multicast MAC address or a hash result of a multicast MAC address in the AID field of a wake-up frame. Alternatively, an AID set/bitmap and/or sequential multiple wake-up frames may be used for downlink multi-user reception.

Figure 7:
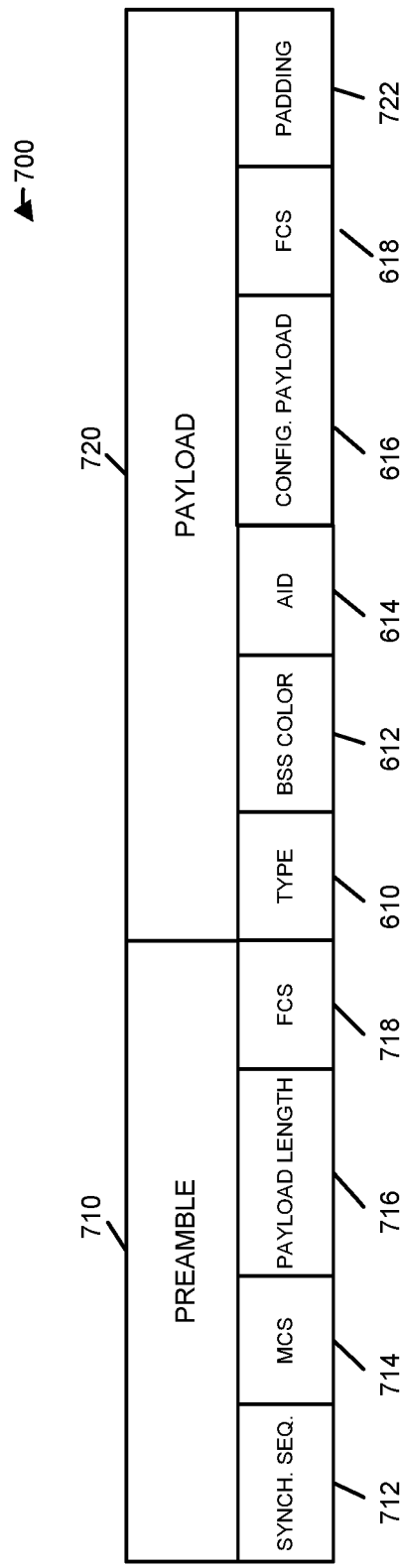

Moreover, a wake-up frame may include a preamble and payload parts. If the preamble contains a payload length having a fixed size, the PPDU structure may be as shown in FIG. 7, which presents a drawing illustrating an example wake-up frame 700. These fields in preamble 710 may have fixed sizes and the recipient electronic device may know when the control sequence of preamble 710 begins. Notably, preamble 710 may contain one or more synchronization sequences (such as synchronization sequence 712) that synchronize the receivers with the transmission and enable them to receive the transmission. Moreover, preamble 710 may contain information indicating the modulation type (such as a modulation coding scheme or MCS 714), a length 716 of the payload and an FCS 718. Payload length 716 may indicate the total size of payload 720 portion, or it may be shortened and may only contain the payload size and may exclude the MAC headers and FCS length. When the size of the payload is indicated, this may set or define a limitation of one frame payload length. Note that the maximum length of a packet may be long, such as, e.g., 2047 bits, so the payload length 716 field may need to be sufficiently long to indicate the length, e.g., 11 bits.

Figure 8:
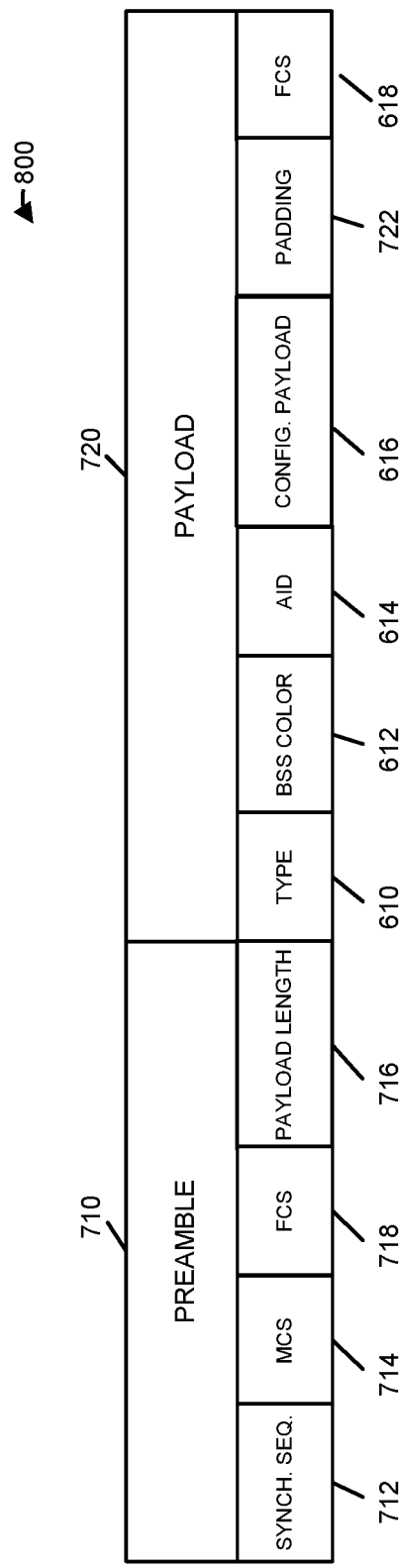

In some embodiments, the payload length 716 field may indicate a number of padding bits 722. If the number of payload padding bits is shown, the size of the field may depend on the transmission mode. This is shown in FIG. 8, which presents a drawing illustrating an example wake-up frame 800. In these embodiments, the checksums may be at fixed positions in wake-up frame 800, and the size of the payload length 716 field may depend on the MCS. Notably, in an on-off-keying transmission mode, each, e.g., 4 µs symbol may contain (or may represent) one bit of information. In this case, the payload length 716 field may not be present. Moreover, if each symbol contains two bits of information, then the payload length 716 field may be one bit in length, and a value of '0' may indicate that the last bit of the transmission is payload, e.g., part of the FCS 618 field. Alternatively, a value of '1' may indicate that the last bit is padding and should not be considered as part of the payload. Similarly, if each symbol indicates four bits of payload, then the payload length 716 may be two bits and the value may indicate the number of padding bits 722 in the last transmitted symbols. When the payload indicates only the number of padding bits 722, then the receiving electronic device may receive the transmission until the next symbol does not contain energy or contains much less energy than the previous symbols.

In other embodiments, the order of items in wake-up frame 600 (FIG. 6), wake-up frame 700 (FIG. 7) and/or wake-up frame 800 (FIG. 8) can vary and additional and/or different items can be included.

In some embodiments, the (signaling) payload of a wake-up frame may be short, and there may be multiple different payload sizes configured. Each configured payload size may define a different signaling message with its own configured operation. Moreover, each payload size may be configured to have different content in the payload. Notably, the wake-up frame that is used most often may be configured to have zero additional payload bits. A wake-up frame with zero additional payload bits may indicate that the addressed receiving electronic device is requested to activate its main radio. For example, in some embodiments, the maximum size of the payload may be, e.g., 7 bits and may result in a total length of the wake-up frame of, e.g., 28-35 bits. Note that the payload may not contain any irrelevant/unnecessary bits. Instead, the payload length may be set to the appropriate or necessary value. Furthermore, each bit in the payload may be configured for or correspond to different operation after the wake-up or to provide measurement assess. Consequently, there may be many alternative configurations or different contents for the wake-up frame. For example, a 7-bit payload may allow 127 ($2^7$-1) different configurations for the operation after the wake-up frame is received, while a 6-bit payload may allow 63 ($2^6$-1) different configurations.

Moreover, the configurable payload signaling may occur during association with an access point or there may be specific a wake-up-frame setup signaling (such as a WUR-setup request from the recipient electronic device to the access point, and a WUR-setup response from the access point to the recipient electronic device). The wake-up-frame setup signaling may configure the wake-up frame payload and the expected (subsequent) operation of the access point and the recipient electronic device. Notably, the wake-up-frame setup signaling may define how many payload bit-length combinations are used for a wake-up frame, and the configurations for each payload length may be listed separately.

Furthermore, the access point may indicate support for different wake-up frame parameters and operations. For example, in some embodiments, the access point may specify a WUR capability field to indicate the parameters supported by the access point. Note that the WUR capability field may be transmitted in one or more beacons and/or one or more probe response frames. The WUR capability field may indicate that the access point transmits a specific value, e.g., a color collision indication or a check beacon field at a dedicated bit position in some or all wake-up frames. In this way, the associated recipient electronic devices can receive this information in one or more wake-up frames transmitted by the access point. In some embodiments, the WUR capability field or other management signaling signals are used by the access point to indicate that the access point supports one or more vendor-specific operations.

Additionally, the recipient electronic device may propose a configuration that is useful for its applications and for its operation. For example, a default wake-up frame may have a small or a minimum size. Notably, the default wake-up frame: may not contain measurement data; and/or may have a small or the minimum number of bits needed to indicate operation (such as a wake-up frame without a payload). In response, the access point may provide the parameter configurations it allows the recipient electronic device to use. Note that the access point may simplify its operation by eliminating signaling alternatives. In some embodiments, the access point may add a payload to the wake-up frame by adding signaling information for other recipient electronic devices in the BSS.

Figure 9:
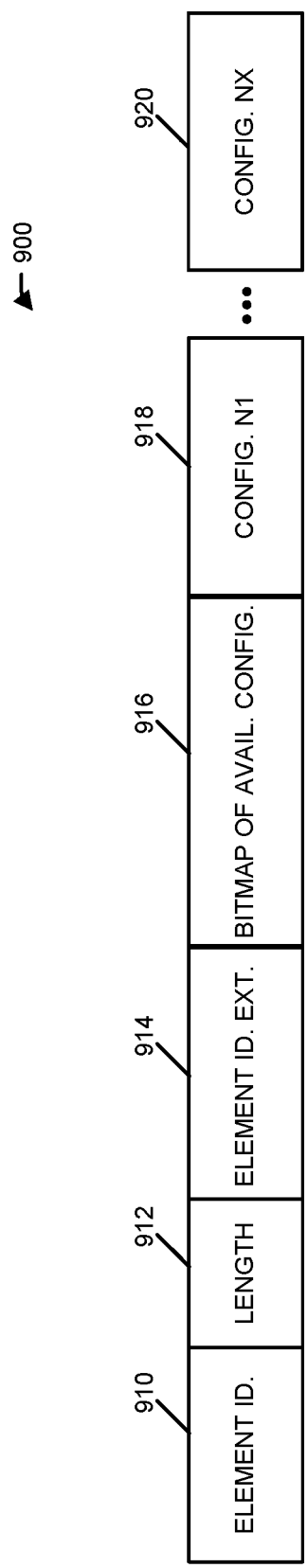
FIG. 9 is a drawing illustrating an example payload-configuration element in a WUR-setup request or a WUR-setup response.

In some embodiments, during the WUR-setup signaling, the wake-up frame payload content and expected operation of the recipient electronic device may be configured. FIG. 9 presents an example payload-configuration element 900 in a WUR-setup request with a proposed configurable wake-up-frame format or a WUR-setup response with a configurable wake-up-frame format. The payload-configuration element 900 may indicate or signal an element identifier 910 and a requested or an accepted payload length 912. In addition, for each payload length, the payload configuration element 900 may indicate or specify the payload content and expected operation after the wake-up frame with the specific payload is transmitted. For example, the payload configuration element 900 may indicate or specify: an element identifier extension 914 and a bitmap of available configurations 916, such as configuration n1 918 through configuration nX 920, where X is an integer. Note that element identifier 910, payload length 912, element identifier extension 914, and bitmap of available configurations 916 may have a length of, e.g., one octet, configuration n1 918 may have a length of, e.g., 4−M octets, and configuration nX may have a length of, e.g., 4−N octets, where M and N are integers greater than or equal to zero.

A bitmap of configured values may indicate which bitmap lengths are configured. Notably, bit 0 of the bitmap of available configurations may be set, e.g., to '1' to indicate to the recipient electronic device that a wake-up frame without any payload performs the operation as defined in configuration 1. Alternatively, this bit may, e.g., be set to a value of '0' to indicate that a wake-up frame has a non-zero payload length. In some embodiments, bit 1 in the bitmap of available configurations may, e.g., be set to '1' to indicate to the recipient electronic device that a wake-up frame has a 1-bit payload based at least in part on the configuration field(s). In payload-configuration element 900, the bits in the bitmap of available configurations 916 that may configure different payload lengths in a wake-up frame.

In other embodiments, the order of items in payload-configuration element 900 can vary and additional and/or different items can be included.

Figure 10:
FIG. 10 is a drawing illustrating an example bitmap of available configurations.

FIG. 10 presents a drawing illustrating an example bitmap of available configurations 1000. In this bitmap of available configurations, the payload in wake-up frames and the operations that the recipient electronic device that receives one of the wake-up frames may be configured as: a wakeup frame without payload, a wakeup frame with payload of 3 bits, and/or a wake-up frame with payload of 6 bits. Moreover, payload with the other numbers of bit values may not be defined and may not be transmitted to the recipient electronic device. Consequently, as described further below, there may be three or more configuration fields. Notably, one or more first configuration field(s) may configure a wake-up frame operation without a payload; one or more second configuration field(s) may configure the content and operation for a payload with 3 bits; and/or one or more third configuration field(s) may configure the content and operation for a payload with 6 bits.

Figure 11:
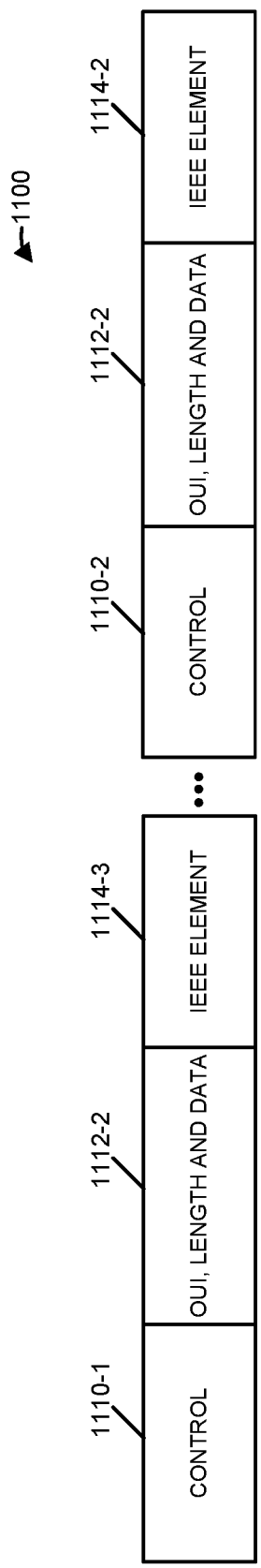
FIG. 11 is a drawing illustrating an example configuration field.
Figure 12:
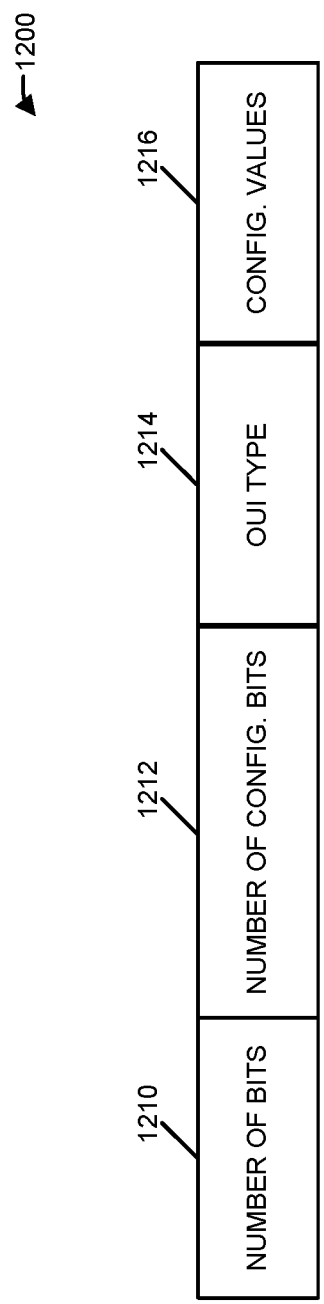
FIG. 12 is a drawing illustrating an example control field.

FIG. 11 presents a drawing illustrating an example configuration field 1100, and FIG. 12 presents a drawing illustrating an example control field 1200. This configuration field may define the content and the operation of the recipient electronic device and the access point. For example, configuration field 1000 may include one or more instances of: a control field (such as control 1110-1) field, an organizationally unique identifier (OUI), length and data field (such as OUI, length and data 1112-1), and/or an IEEE element field (such as IEEE element 1114-1). Note that each instance of the control field may have a length of, e.g., two octets, each instance of the OUI, length and data may have a length of, e.g., 0–X octets, and each instance of the IEEE element may have a length of, e.g., 0–Y octets, where X and Y are non-zero integers. Moreover, control field 1200 may include: a total number of bits 1210, a number of configured bits 1212, an OUI type 1214 and configured values 1216. For example, the total number of bits 1210 may have a length of three bits, the number of configured bits 1212 may have a length of three bits, the OUI type 1214 may have length of two bits, and configured values 1216 may have a length of eight bits.

Note that the total number of bits sub-field 1210 may indicate the number of payload bits in the wake-up frame that are configured by this configuration field. Moreover, the number of configured bits 1212 sub-field and the configured values 1214 sub-field may indicate the number of bits and the number of values of the bits. Furthermore, the OUI type 1214 and the IEEE element 1216 sub-fields may have values, e.g., of '0' and '0' to configure the access point and the recipient electronic device operation when a wake-up frame without a payload is received. For example, the OUI type 1214 sub-field may specify Wi-Fi or a company. Alternatively, the configured values 1214 sub-field may, e.g., be set to a value of 2 raised to or having an exponent of the number of configured bits to indicate that all values of the bits are configured. Note that, if some bit values are not configured, the next control sub-field with the same total number of bits and the number of configured bits may configure values starting from the next non-configured value.

Moreover, the OUI type 1214 sub-field may, e.g., have a value '0' to indicate that this element is defined in the IEEE element 1216 sub-field. Alternatively, the OUI type 1214 sub-field may, e.g., have a value '1' to indicate that this element is defined in the Wi-Fi communication protocol, or the OUI type 1214 sub-field may, e.g., have a value '2' to indicate that the OUI, length and data 1112 field is present and may be set to indicate the organization that has configured the value.

Figure 13:
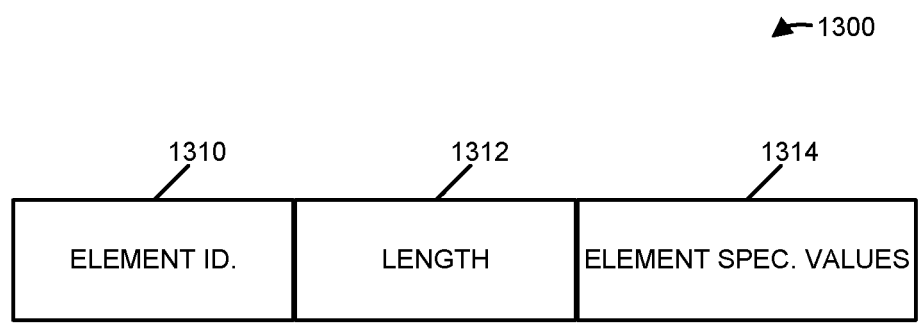
FIGS. 13 and 14 are drawings illustrating example organizationally unique identifier (OUI) type sub-fields.
Figure 14:
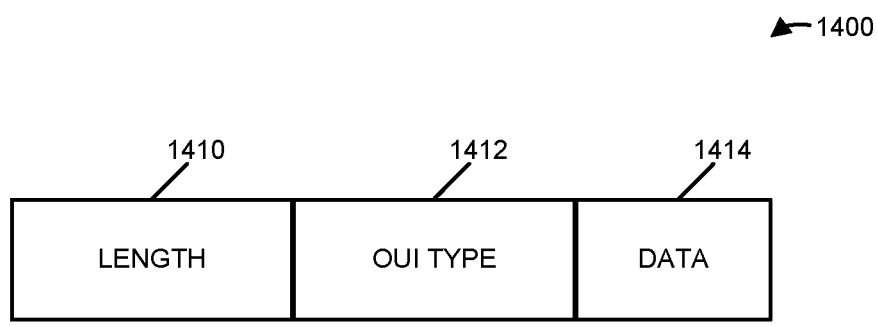

FIG. 13 is a drawing illustrating an example OUI type 1300 sub-field, and FIG. 14 is a drawing illustrating an example OUI type 1400 sub-field. Notably, OUI type 1300 sub-field may include: an element identifier 1310, a length 1312 and/or one or more element specific values 1314. Moreover, OUI type 1400 sub-field may include: a length 1410, an OUI type 1412 value and/or data 1414. OUI type 1300 sub-field may be used when the OUI type value is '0' or '1', while OUI type 1400 sub-field may be used when the OUI type value is '2'. Note that element identifier 1310 may have a length of, e.g., one octet, length 1312 may have a length of, e.g., one octet, and the one or more element specific values 1314 may have a length of up to N octets, where N is an integer. Furthermore, length 1410 may have a length of one octet, the OUI type 1412 value may have a length of three octets, and data 1414 may have a length of 1–K, where K is an integer.

Note that length 1410 may indicate the length of the data following OUI type 1400 sub-field. Moreover, the OUI type 1412 sub-field may indicate a vendor-specific identifier that specifies the organization that has defined the following element. Alternatively, referring back to FIG. 13, if the IEEE element or the Wi-Fi communication protocol defines the element, then, an IEEE-specific element structure may be used, such as OUI type 1300 sub-field.

In other embodiments, the order of items in configuration field 1100, control field 1200, OUI type 1300 sub-field and/or OUI type 1400 sub-field can vary and additional and/or different items can be included.

In summary, the communication techniques enable the recipient electronic device and/or the access point to configure wake-up-frame payload lengths and the values that are available for wake-up frames. In some embodiments, the communication techniques allow the payload elements and operation of the access point and/or and the recipient electronic device after wake-up-frame transmission to be defined. The configurable payload may allow the wake-up-frame size to be reduced or minimized. In addition, the configurable payload may allow the access point and/or the recipient electronic device to improve or optimize the access point and/or the recipient electronic device operation after the wake-up-frame transmission. In some embodiments, the communication techniques allow a wake-up frame to specify or indicate vendor-specific operations.

We now describe embodiments of an electronic device. FIG. 15 presents a block diagram of an electronic device 1500 (which may be a cellular telephone, an access point, another electronic device, etc.) in accordance with some embodiments. This electronic device includes processing subsystem 1510, memory subsystem 1512, and networking subsystem 1514. Processing subsystem 1510 includes one or more devices configured to perform computational operations. For example, processing subsystem 1510 can include one or more microprocessors, application-specific integrated circuits (ASICs), graphics processing units (GPUs), microcontrollers, programmable-logic devices, and/or one or more digital signal processors (DSPs).

Memory subsystem 1512 includes one or more devices for storing data and/or instructions for processing subsystem 1510 and networking subsystem 1514. For example, memory subsystem 1512 can include dynamic random access memory (DRAM), static random access memory (SRAM), a read-only memory (ROM), flash memory, and/or other types of memory. In some embodiments, instructions for processing subsystem 1510 in memory subsystem 1512 include: program instructions or sets of instructions (such as program instructions 1522 or operating system 1524), which may be executed by processing subsystem 1510. For example, a ROM can store programs, utilities or processes to be executed in a non-volatile manner, and DRAM can provide volatile data storage, and may store instructions related to the operation of electronic device 1500. Note that the one or more computer programs may constitute a computer-program mechanism, a computer-readable storage medium or software. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510. In some embodiments, the one or more computer programs are distributed over a network-coupled computer system so that the one or more computer programs are stored and executed in a distributed manner.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Figure 15:
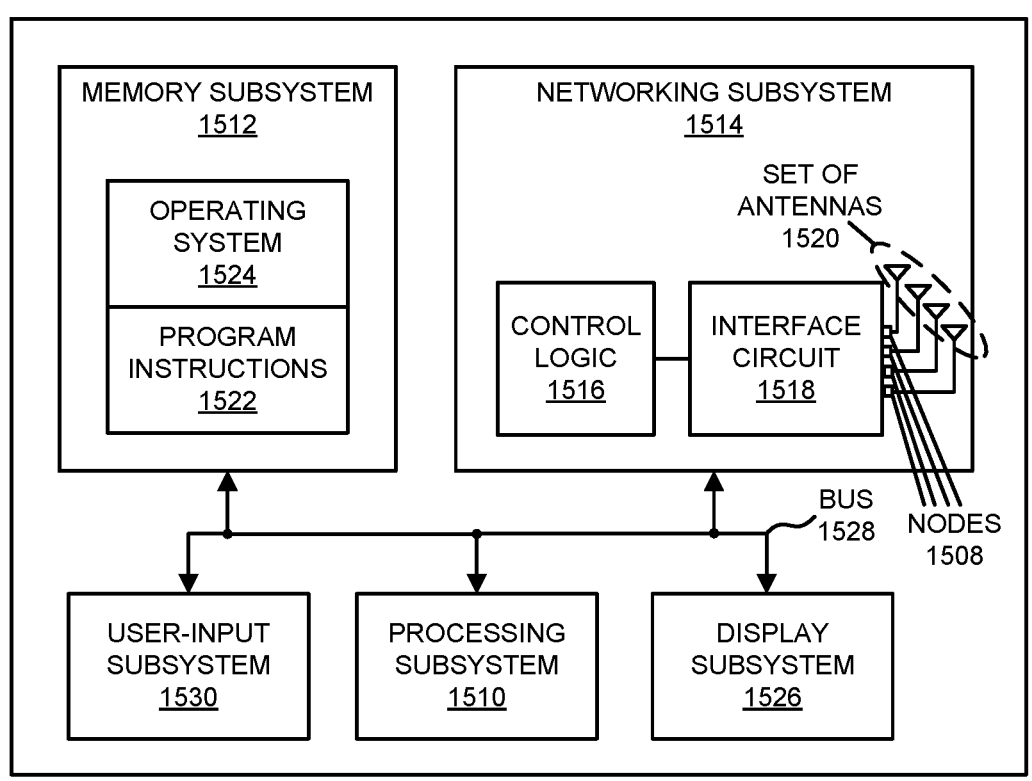
FIG. 15 is a block diagram illustrating an example of one of the electronic devices of FIG. 1.

Networking subsystem 1514 includes one or more devices configured to couple to and communicate on a wired and/or wireless network (i.e., to perform network operations), including: control logic 1516, an interface circuit 1518 and a set of antennas 1520 (or antenna elements) in an adaptive array that can be selectively turned on and/or off by control logic 1516 to create a variety of optional antenna patterns or 'beam patterns.' (While FIG. 15 includes set of antennas 1520, in some embodiments electronic device 1500 includes one or more nodes, such as nodes 1508, e.g., a pad, which can be coupled to set of antennas 1520. Thus, electronic device 1500 may or may not include set of antennas 1520.) For example, networking subsystem 1514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1514 includes one or more radios, such as a WUR that is used to receive wake-up frames, and a main radio that is used to transmit and/or receive frames or packets during a higher-power mode. The WUR and the main radio may be implemented separately (such as using discrete components or separate integrated circuits) or in a common integrated circuit.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices.

Within electronic device 1500, processing subsystem 1510, memory subsystem 1512, and networking subsystem 1514 are coupled together using bus 1528 that facilitates data transfer between these components. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the sub systems.

In some embodiments, electronic device 1500 includes a display subsystem 1526 for displaying information on a display, which may include a display driver and the display, such as a liquid-crystal display, a multi-touch touchscreen, etc. Display subsystem 1526 may be controlled by processing subsystem 1510 to display information to a user (e.g., information relating to incoming, outgoing, or an active communication session).

Electronic device 1500 can also include a user-input subsystem 1530 that allows a user of the electronic device 1500 to interact with electronic device 1500. For example, user-input subsystem 1530 can take a variety of forms, such as: a button, keypad, dial, touch screen, audio input interface, visual/image capture input interface, input in the form of sensor data, etc.

Electronic device 1500 can be (or can be included in) any electronic device with at least one network interface. For example, electronic device 1500 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments some or all of a given subsystem or component can be integrated into one or more of the other subsystems or component(s) in electronic device 1500. For example, in some embodiments program instructions 1522 are included in operating system 1524 and/or control logic 1516 is included in interface circuit 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514. This integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms)

that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 1522, operating system 1524 (such as a driver for interface circuit 1518) or in firmware in interface circuit 1518. Alternatively or additionally, at least some of the operations in the communication technique may be implemented in a physical layer, such as hardware in interface circuit 1518. In some embodiments, the communication technique is implemented, at least in part, in a MAC layer and/or in a physical layer in interface circuit 1518.

While examples of numerical values are provided in the preceding discussion, in other embodiments different numerical values are used. Consequently, the numerical values provided are not intended to be limiting.

While the preceding embodiments illustrated the use of a wake-up frame that is communicated using Wi-Fi, in other embodiments of the communication technique Bluetooth Low Energy is used to communicate the wake-up frame. Furthermore, the wake-up frame may be communicated in the same or a different band of frequencies that the band(s) of frequencies used by the main radio. For example, the wake-up frame may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a node configured to communicatively couple to an antenna; and
   an interface circuit, communicatively coupled to the node, configured to communicate with a recipient electronic device, and configured to:
   receive a wake-up-radio (WUR)-setup request associated with the recipient electronic device, wherein the WUR-setup request specifies a proposed configurable wake-up-frame format;
   provide a WUR-setup response intended for the recipient electronic device,
   wherein the WUR-setup response specifies a selected configurable wake-up-frame format,
   wherein the proposed configurable wake-up-frame format and the selected configurable wake-up-frame format are selected from a set of predefined configurable wake-up frame formats associated with the recipient electronic device,
   wherein a given wake-up frame format in the set of predefined configurable wake-up frame formats comprises a control field configured to convey control information, and
   wherein at least two wake-up frame formats in the set of predefined configurable wake-up frame formats have different non-zero payload lengths and one or more of the different payload lengths is associated with an amount of payload data that comprises data and does not include the control information.

2. The electronic device of claim 1, wherein the electronic device is configured to determine the selected configurable wake-up-frame format based at least in part on the proposed configurable wake-up-frame format.

3. The electronic device of claim 1, wherein the interface circuit is configured to provide a wake-up frame for the recipient electronic device comprising the selected configurable wake-up-frame format.

4. The electronic device of claim 3, wherein the wake-up frame signals that a main radio in the recipient electronic device is to transition from a lower-power mode to a higher-power mode.

5. The electronic device of claim 1, wherein the selected configurable wake-up-frame format specifies a payload length in a wake-up frame.

6. The electronic device of claim 1, wherein the selected configurable wake-up-frame format comprises a portion specifying one or more operations of at least one of the recipient electronic device or the electronic device after a wake-up frame is transmitted by the electronic device; and
wherein each bit in the portion corresponds to a different operation in the one or more operations.

7. The electronic device of claim 1, wherein the electronic device comprises an access point.

8. The electronic device of claim 1, wherein the WUR-setup request and the WUR-setup response are compatible with an IEEE 802.11 communication protocol.

9. A non-transitory computer-readable storage medium for use in conjunction with an electronic device, the computer-readable storage medium storing program instructions that, when executed by the electronic device, causes the electronic device to utilize a selected configurable wake-up-frame format by carrying out one or more operations comprising:
receiving, via an interface circuit in the electronic device, a wake-up-radio (WUR)-setup request associated with a recipient electronic device, wherein the WUR-setup request specifies a proposed configurable wake-up-frame format;
providing, via the interface circuit, a WUR-setup response intended for the recipient electronic device, wherein the WUR-setup response specifies the selected configurable wake-up-frame format,
wherein the proposed configurable wake-up-frame format and the selected configurable wake-up-frame format are selected from a set of predefined configurable wake-up frame formats associated with the recipient electronic device,
wherein a given wake-up frame format in the set of predefined configurable wake-up frame formats comprises a control field that conveys control information, and
wherein at least two wake-up frame formats in the set of predefined configurable wake-up frame formats have different non-zero payload lengths and one or more of the different payload lengths is associated with an amount of payload data that comprises data and does not include the control information.

10. The computer-readable storage medium of claim 9, wherein the one or more operations comprise determining the selected configurable wake-up-frame format based at least in part on the proposed configurable wake-up-frame format.

11. The computer-readable storage medium of claim 9, wherein the one or more operations comprise providing, from the interface circuit, a wake-up frame for the recipient electronic device comprising the selected configurable wake-up-frame format.

12. The computer-readable storage medium of claim 11, wherein the wake-up frame signals that a main radio in the recipient electronic device is to transition from a lower-power mode to a higher-power mode.

13. The computer-readable storage medium of claim 9, wherein the selected configurable wake-up-frame format specifies a payload length in a wake-up frame.

14. The computer-readable storage medium of claim 9, wherein the selected configurable wake-up-frame format comprises a portion that specifies one or more operations of at least one of the recipient electronic device or the electronic device after a wake-up frame is transmitted by the electronic device; and
wherein each bit in the portion corresponds to a different operation in the one or more operations.

15. The computer-readable storage medium of claim 9, wherein the electronic device comprises an access point.

16. The computer-readable storage medium of claim 9, wherein the WUR-setup request and the WUR-setup response are compatible with an IEEE 802.11 communication protocol.

17. A method for providing a selected configurable wake-up-frame format, comprising:
by an electronic device:
receiving a wake-up-radio (WUR)-setup request associated with a recipient electronic device, wherein the WUR-setup request specifies a proposed configurable wake-up-frame format;
providing a WUR-setup response intended for the recipient electronic device, wherein the WUR-setup response specifies the selected configurable wake-up-frame format,
wherein the proposed configurable wake-up-frame format and the selected configurable wake-up-frame format are selected from a set of predefined configurable wake-up frame formats associated with the recipient electronic device,
wherein a given wake-up frame format in the set of predefined configurable wake-up frame formats comprises a control field that conveys control information, and
wherein at least two wake-up frame formats in the set of predefined configurable wake-up frame formats have different payload lengths and one or more of the different payload lengths is associated with non-zero amount of payload data that does not include the control information.

18. The method of claim 17, wherein the method comprises determining the selected configurable wake-up-frame format based at least in part on the proposed configurable wake-up-frame format.

19. The method of claim 17, wherein the method comprises providing a wake-up frame for the recipient electronic device comprising the selected configurable wake-up-frame format.

20. The method of claim 17, wherein the selected configurable wake-up-frame format specifies a payload length in a wake-up frame.

* * * * *